United States Patent [19]

Jain et al.

[11] Patent Number: 4,608,685
[45] Date of Patent: Aug. 26, 1986

[54] PACKET AND CIRCUIT SWITCHED COMMUNICATIONS NETWORK

[75] Inventors: Prem C. Jain, Fremont; Frederick Enns, Menlo Park, both of Calif.

[73] Assignee: Northern Telecom Limited, Montreal, Canada

[21] Appl. No.: 605,721

[22] Filed: Apr. 30, 1984

[51] Int. Cl.⁴ .............................................. H04J 3/02
[52] U.S. Cl. ...................................... 370/85; 370/94; 370/96
[58] Field of Search ....................... 370/90, 89, 85, 94, 370/95, 96; 340/825.5, 825.51

[56] References Cited

U.S. PATENT DOCUMENTS

| | | | |
|---|---|---|---|
| 3,985,962 | 10/1976 | Jones et al. | 370/90 |
| 4,154,983 | 5/1979 | Pedersen | 370/89 |
| 4,251,880 | 2/1981 | Baugh et al. | 370/89 |
| 4,380,065 | 4/1983 | Hirtle et al. | 370/96 |
| 4,516,239 | 5/1985 | Maxemchuk | 370/94 |

FOREIGN PATENT DOCUMENTS 2131654 6/1984 United Kingdom ................. 370/94

*Primary Examiner*—Douglas W. Olms
*Attorney, Agent, or Firm*—Schwartz, Jeffery, Schwaab, Mack, Blumenthal & Evans

[57] ABSTRACT

A telecommunications network being operable as a packet switch and as a circuit switch is comprised of a plurality of units including a call controller unit. Each of the units is connected in common to data, address, and control leads of a bus, the data leads being commonly available for signal transmissions of both call control signals between the call controller unit and the other units and communications signals between calling and called ones of the other units. A bus controller is connected to the units by way of the address and control leads for arbitrating access to the data leads by the units, so that only one unit may transmit at any one time. The bus controller includes, a poll circuit for polling the units for asynchronous transmission requests, a grant circuit being responsive to the requests, for granting access to the data leads for an indefinite period of time as required for transmission of a data packet from one of the units, and a synchronous cycle circuit, being responsive to a synchronous request signal from any of the units, for generating a synchronous cycle signal for inhibiting data packet transmission and enabling synchronous data transmission via the data leads during a predetermined period of time.

14 Claims, 10 Drawing Figures

PACKET AND CIRCUIT SWITCHED COMMUNICATIONS NETWORK

FIELD OF THE INVENTION

The invention is in the field of switching networks for telecommunications systems, and more particularly relates to a switching network wherein digital call control signals and digital communications signals share a network bus common to both, and which accommodates communication of digital signals of asynchronous and synchronous natures respectively.

BACKGROUND OF THE INVENTION

The technology of telephone communications has evolved over a period of time during which telephony voice communication has been of primary concern. Telephony voice communication has been traditionally provided via circuit switched telephone facilities. Circuit switched facilities are characterized in that a circuit or a communication path is separately dedicated to each active telephone conversation throughout the entire duration of the telephone conversation. More recently communication paths have been more economically provided by respectively assigned channels in a time division multiplex (TDM) telephone exchange.

It is only in the last twenty years or so that consideration and requirements for communication systems capable of carrying a rapidly growing volume of data communication has had any significant impact on the production of communications systems in general. In contrast to the circuit switched design philosophy of telephone voice communications systems, more economical data transmission systems are typically based on a packet switching design philosphy. Packet switching is characterized in that a circuit or communication path is exclusively committed to various of data transactions one after another. Each data transaction occupies the communication path for a time which is consistent with the volume of the data divided by the bandwidth of the communication path.

Synchronous communications are most efficiently handled by circuit switched facilities. Each synchronous communication occupies a communication path or channel for the full duration of the communication without regard to utilization of bandwidth. Asynchronous communications are most efficiently handled by packet switched facilities. Each asynchronous communication, sometimes referred to as a transaction, utilizes the full bandwidth of a circuit path for only as much time as data volume divided by the bandwidth requires. Asynchronous data transmitted via circuit switched facilities seldom utilize the available bandwidth. In packet switched facilities if traffic is present the full bandwidth is used. However because of the asynchronous nature of information transfer between ports in a packet switched system, attempts to use this type of system for voice i.e. synchronous information transfers, have resulted in relatively intricate and complicated solutions which typically exhibit lesser performance than is practically acceptable. An extensive summary of the capabilities and consequences of packet switching and various exemplary systems has been documented by Roy D. Rosner under the title of "Packet Switching Tomorrow's Communications Today" and published by Lifetime Learning Publications, a division of Wadsworth, Inc., in Belmont, California.

It is apparent that asynchronous data information is inefficiently communicated by circuit switched facilities. Furthermore holding times for asynchronous data transmission in a circuit switched facility can greatly exceed the typical duration of a voice telephone conversation. Thus extensive data traffic tends to seriously congest the typical circuit switched network. It is also apparent that currently available packet switching facilities are not a practical alternative to circuit switched facilities for voice-like information as receiving delays are typically too long, and even worse are inconsistent. Thus in both public and private communications systems circuit switched facilities are typically provided. Where the occasion warrants, packet switching is provided as a separate network exclusively for asynchronous data communcations.

SUMMARY OF THE INVENTION

It is an object of the invention to provide a telecommunications network capable of operating as a packet switch and as a circuit switch.

It is also an object of the invention to provide for both packet switching and circuit switching between a plurality of units by way of a bus which is connected in common to all of the units.

It is a further object of the invention to provide a bus controller being connected to the units by way of address leads and control leads in the bus, for arbitrating access to data leads in the bus for transmission of asynchronous call control signals between a call controller one of the units and other ones of the units, and for transmission of communications signals between the other ones of the units.

In accordance with the invention, a telecommunications switching network comprises a plurality of units including a call controller unit; data leads being connected to each of the units and being commonly available for signal transmission of both call control signals between the call controller unit and the other units, and communications signals between calling and called ones of the other units; and a bus controller also being connected to each of the units for arbitrating access to the data bus by the units, so that only one unit may transmit said signals at any one instant in time.

The bus controller comprises: a poll means for polling the units for asynchronous transmission requests; grant means for granting access to the data leads for an indefinite period of time, as required for transmission of a data packet from one of the units, sometime after an occurrence of an asynchronous transmission request from said one unit; and a synchronous cycle means being responsive to an occurrence of a synchronous request signal from any of the units, for generating a synchronous cycle signal for a predetermined time commencing at a preset time after said occurrence, for inhibiting data packet transmission and enabling a synchronous data transmission via the data leads during said predetermined period of time.

In one example of the invention, the bus controller is connected to the units via a group of address leads and a plurality of control leads. The poll means includes a counter for periodically generating a series of addresses for polling the units one after the other. The grant means includes a queue storage means being responsive to an occurrence of an asynchronous transmission request in the form of a request flag having been asserted on a request of one of the control leads by a polled unit for storing the address corresponding to the unit. An address select means is responsive to the presence of at least one address in the queue storage means for inhibiting the address counter and for causing the address to be withdrawn from the queue storage means and to be asserted on the address leads coincident with generating a grant flag on a grant one of the control leads whereby access is granted to a unit as indicated by the asserted address.

Also in accordance with the invention, a telecommunications switching network is operated to provide for transmission of signals between units connected to a bus in the switching network wherein the signals include both call control signals for transmission between a call controller one of the units and another of the units and communication signals for transmission between calling and called ones of the other units. In the method of operation a bus controller arbitrates access to the bus for signal transmission from the units by polling the units for asynchronous transmission requests and by granting access to the bus for an indefinite period of time to each of the units which has responded to being polled. The bus controller also generates frame and clock signals for defining frame periods each consisting of a plurality of bus cycles. A unit, which requires access to the bus for synchronous transmission, asserts a synchronous request signal at a predetermined time preceding a bus cycle having been designated by the call controller unit and thereafter transmits a communication signal on the bus during the designated bus cycle. A unit, which has been defined by the call controller unit as a receiver during the designated bus cycle, receives the communication signal from the bus during the designated cycle. The remaining units including any unit having been granted access for asynchronous transmission, cease transmitting and/or receiving throughout the duration of the designated bus cycle.

BRIEF DESCRIPTION OF THE DRAWINGS

An example embodiment is described with reference to the accompanying drawings in which.

DESCRIPTION OF THE EXAMPLE EMBODIMENT

Figure 1:
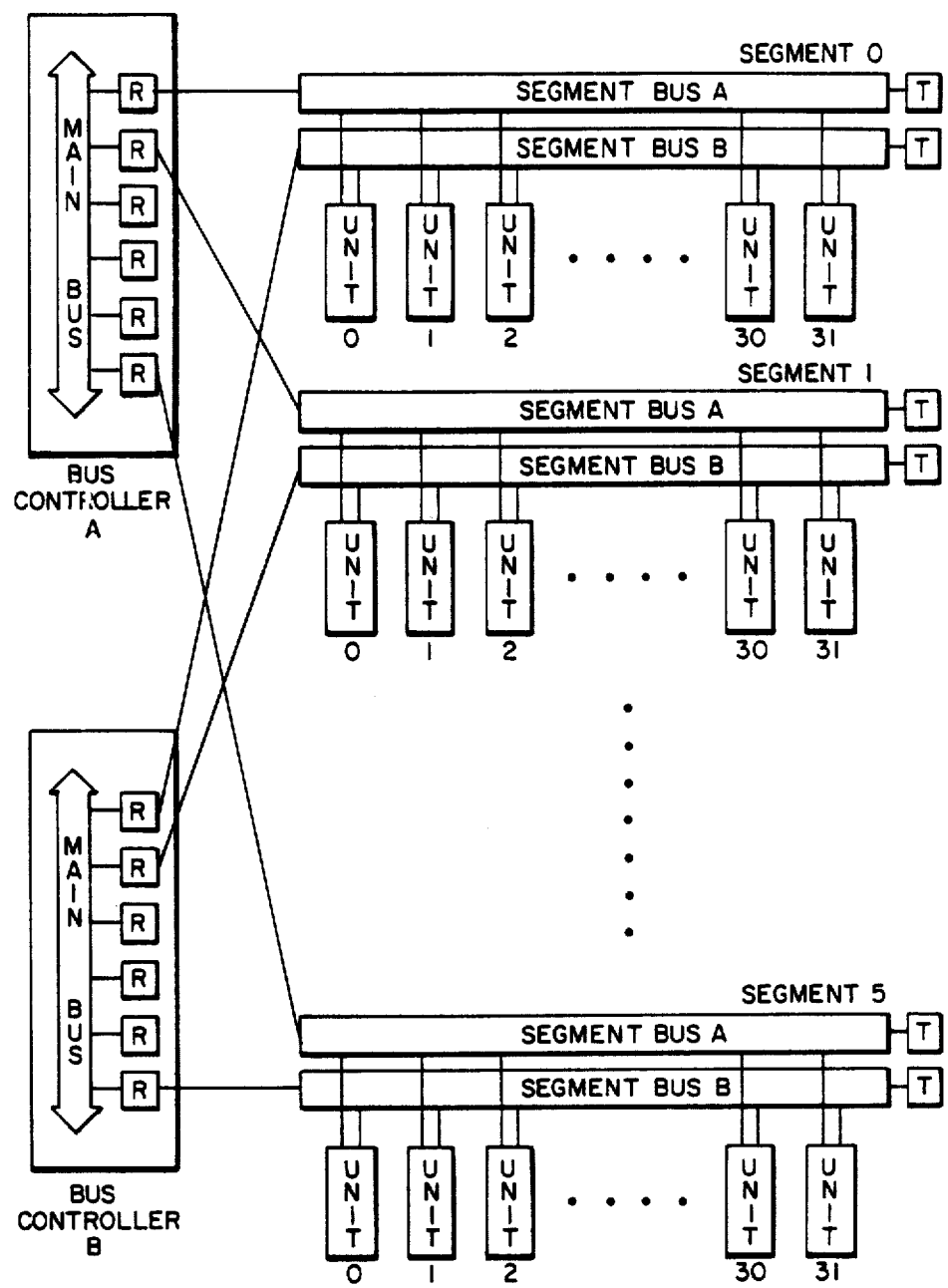
FIG. 1 is a block diagram of packet and circuit switched communications networks in accordance with the invention.

In the description of the exmple embodiment power and ground elements required for the operation of the communications networks are neither discussed nor illustrated, as these elements are well understood by persons of typical skill in the electronic arts. Also in the interest of brevity, the generation and distribution of clock signals for the operation of the telecommunication switching network is limited to that which is convenient for an understanding of the communications networks. The embodiment illustrated in the drawings is constructed from "off-the-shelf" components, primarily silicon integrated circuits being mounted on printed circuit boards, sometimes referred to as cards. The printed circuit boards are connectable to back plane panels which carry various leads for conducting signals between the various circuit boards.

Figure 9:
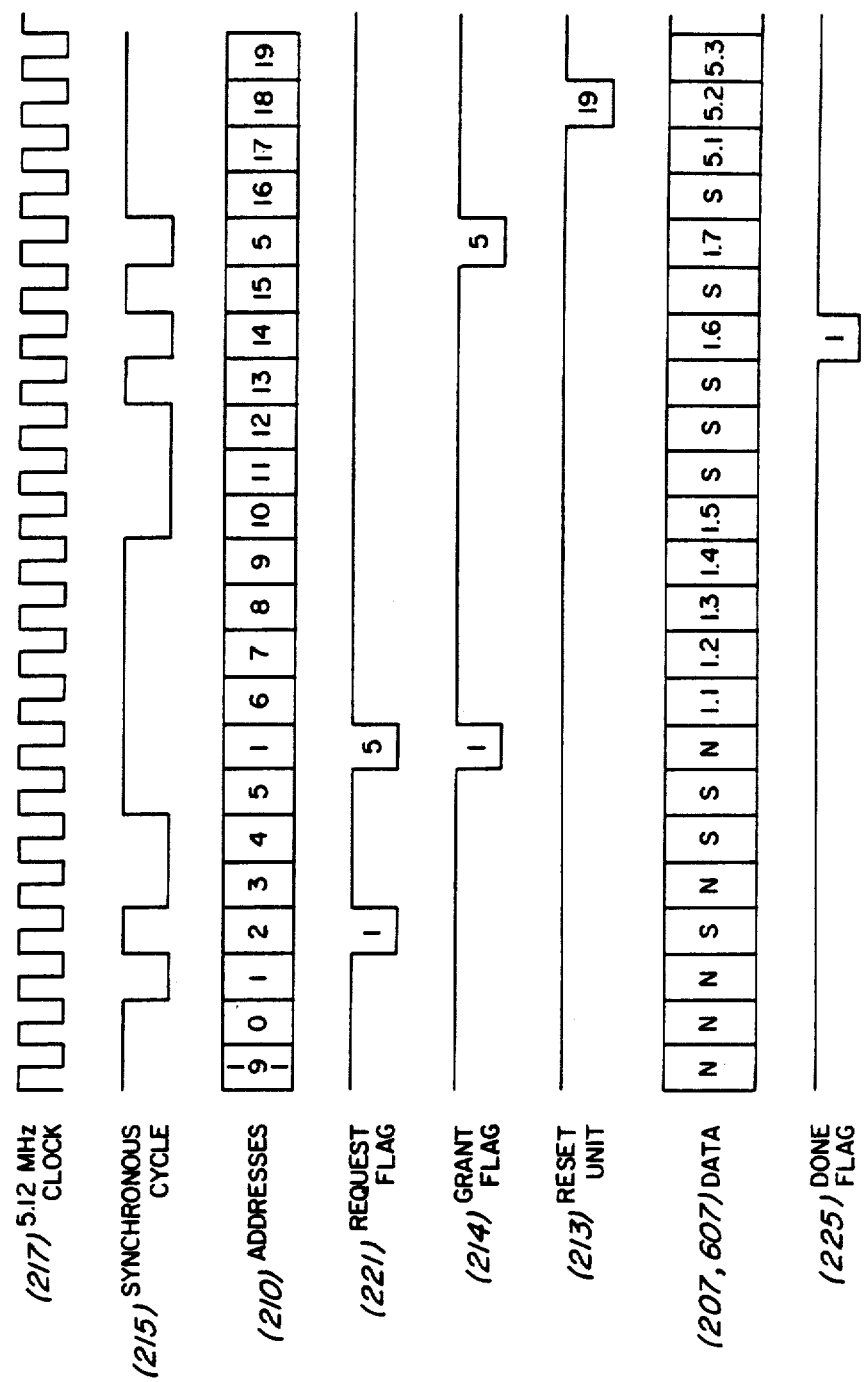
FIG. 9 is an example illustration of bus protocol timing for granting bus access for communication of packetized data in the communication networks in FIG. 1.
Figure 10:
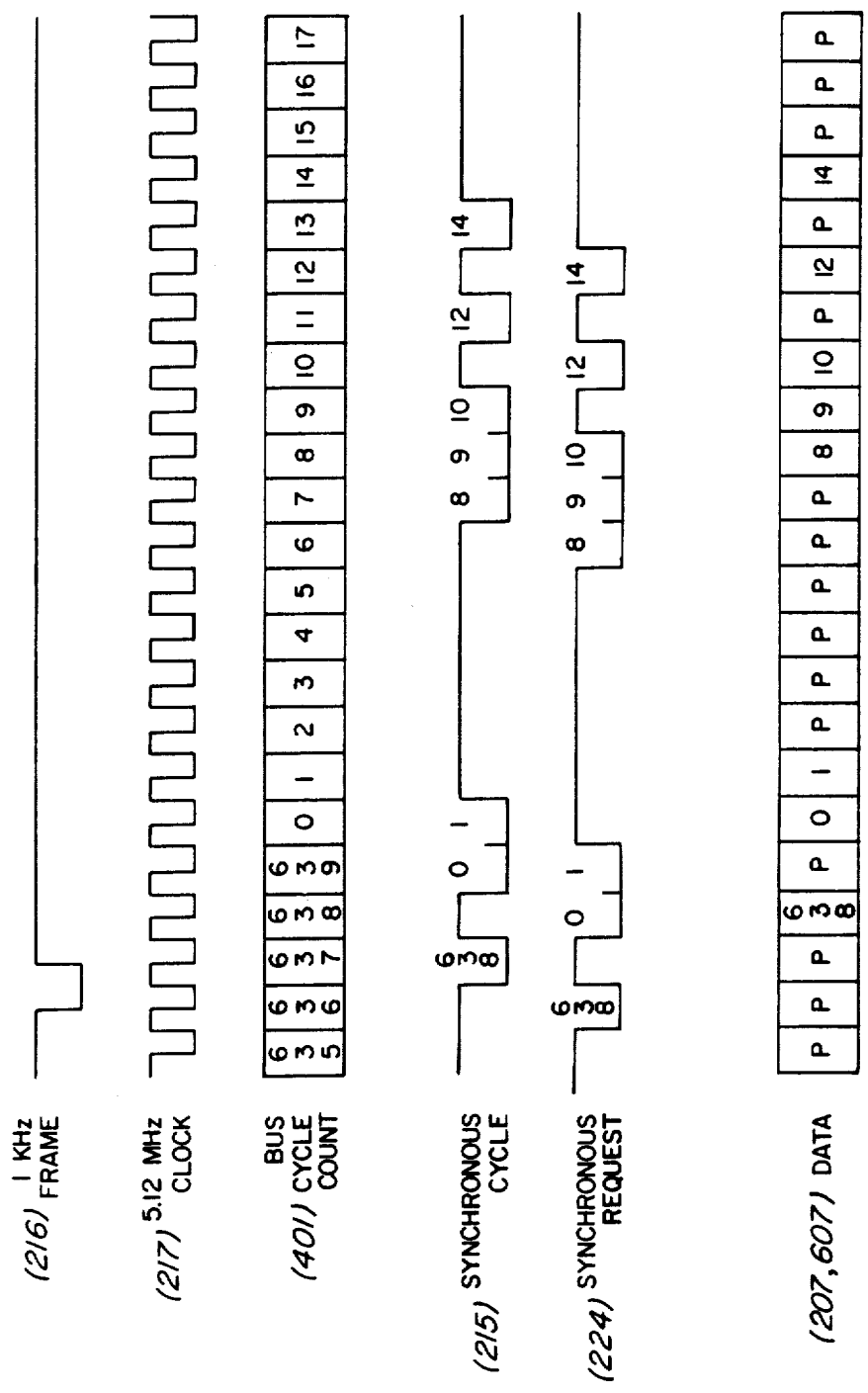
FIG. 10 is an example illustration of synchronous bus cycle protocol timing for granting bus access for communication of synchronous data in the communication networks of FIG. 1.

In FIG. 1, a redundant pair of networks, A and B, are provided for reliability. A Bus Controller A and a Bus Controller B each include a Main Bus and up to six Repeaters R, each for interfacing the Main Bus with each of up to six Segment Buses A and B respectively. An A and B pair of the Segment Buses in each Segment provide for connection at up to thirty-two Unit Locations (0-31). All of the buses include multiple conductors providing data leads and address leads which are utilized to carry digital signals in a parallel signal format as well as various control leads. Only those elements being associated with an active one of the netorks A or B are normally in active use at any one time. Each of the Segment Buses is terminated remote from its associated Repeater R by a Terminator T. Each of the Terminators T provide an impedance termination for each of the conductors in the associated Segment Bus and also provides return parity indications for use in the associated bus controller. At each of the Unit Locations 0-31 a bus/unit interface circuit is required to provide transmitting and receiving access to the Segment Buses by means of a regimented signal protocol as illustrated in FIGS. 9 and 10 and which is described in more detail in a later portion of the disclosure. Each of the bus/unit interface circuits is identical to the other insofar as it comprises circuitry as exemplified in FIG. 7. Each unit is specialized to exclusively perform one of several specific tasks. Examples of some of these tasks are as follows:

line circuit interface and synchronous signals conversion for analog telephone station sets;

line circuit interface and synchronous digital signal formation for digital telephone station sets;

asynchronous digital line circuit interface for work stations or a host computer;

digital trunk circuit circuit interface for synchronous signals;

digital trunk circuit interface for asynchronous signals;

synchronous digital signal service circuits, such as tone receiver, tone generators, etc., for providing the well-known signalling and supervisory functions required in telephone networks; and feature interface for synchronous and asynchronous value added features for example data and/or voice messaging facilities.

The above-listed tasks are merely illustrative of the various communications services which may be provided with appropriate units by way of the network of FIG. 1. One task not mentioned in the list is that of call controlling. At least one of the Unit Locations of the networks A and B is occupied by a call controller Unit. The call controller Unit is similar to a central controller in any of various computer controlled switching systems, insofar as it defines communication paths between calling and called ones of the other Units. The structure and operation of an exemplary call controller Unit or of any of the other Units is neither illustrated nor described in any detail as such is not essential to an understanding of the telecommunication network of the instant invention. It is one of the telecommunications networks of FIG. 1 which in itself actively provides for inter and intra Unit communications of synchronous and asynchronous digital signals. The structure and operation of the networks in FIG. 1 is described in more detail with reference to the FIGS. 2-10.

Figure 2:
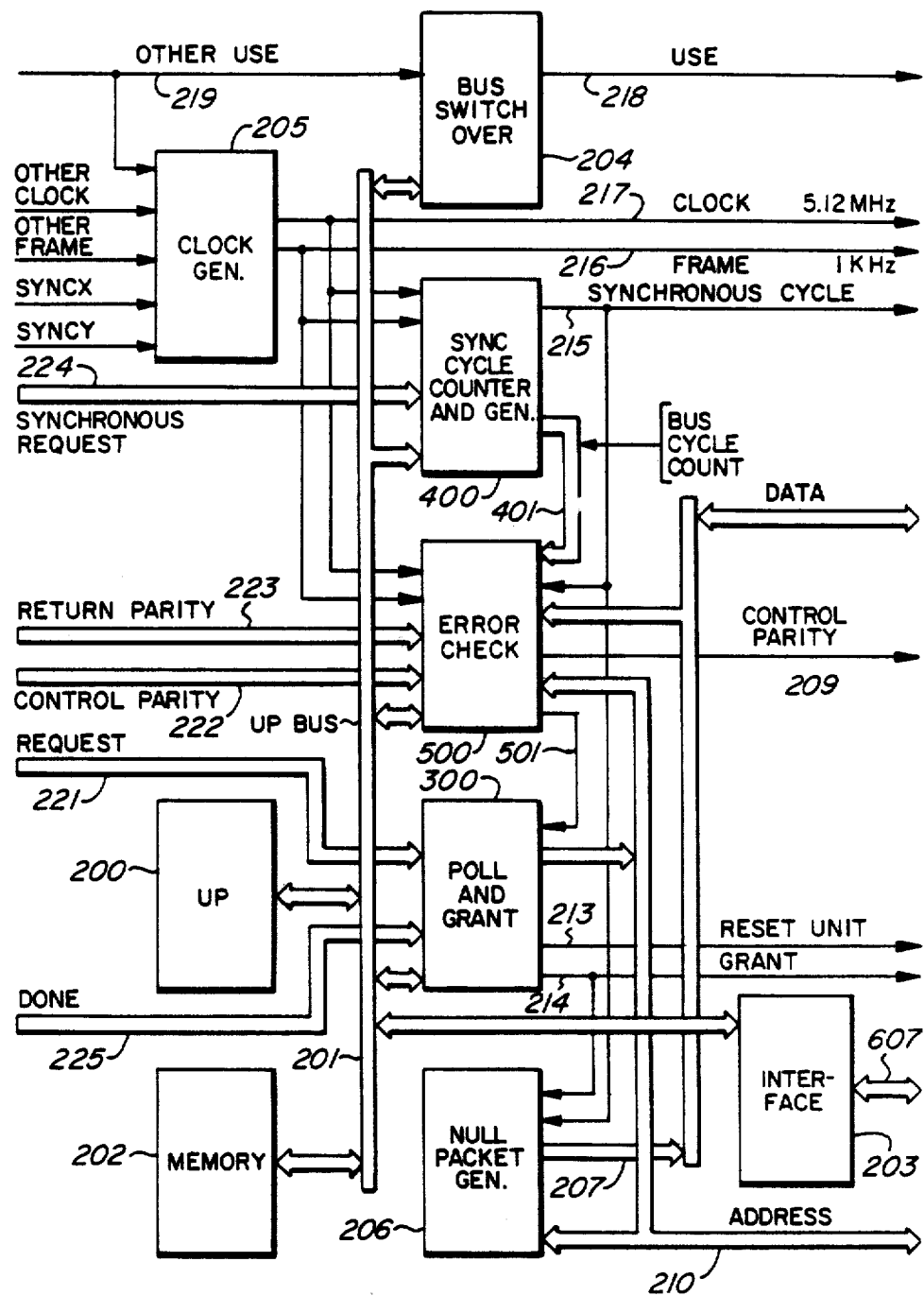
FIG. 2 is a block schematic diagram of a bus controller used in FIG. 1 for controlling the flow of communciations through one of the networks.

The Bus Controller in FIG. 2 is the source of all timing, control, and address signals which are eventually communicated via ADDRESS and control leads to an associated Segment Bus. In normal operation the Units are the sources of all response signals. The Units and the Bus Controller are sources of data information signals communicated via DATA leads.

Figure 6:
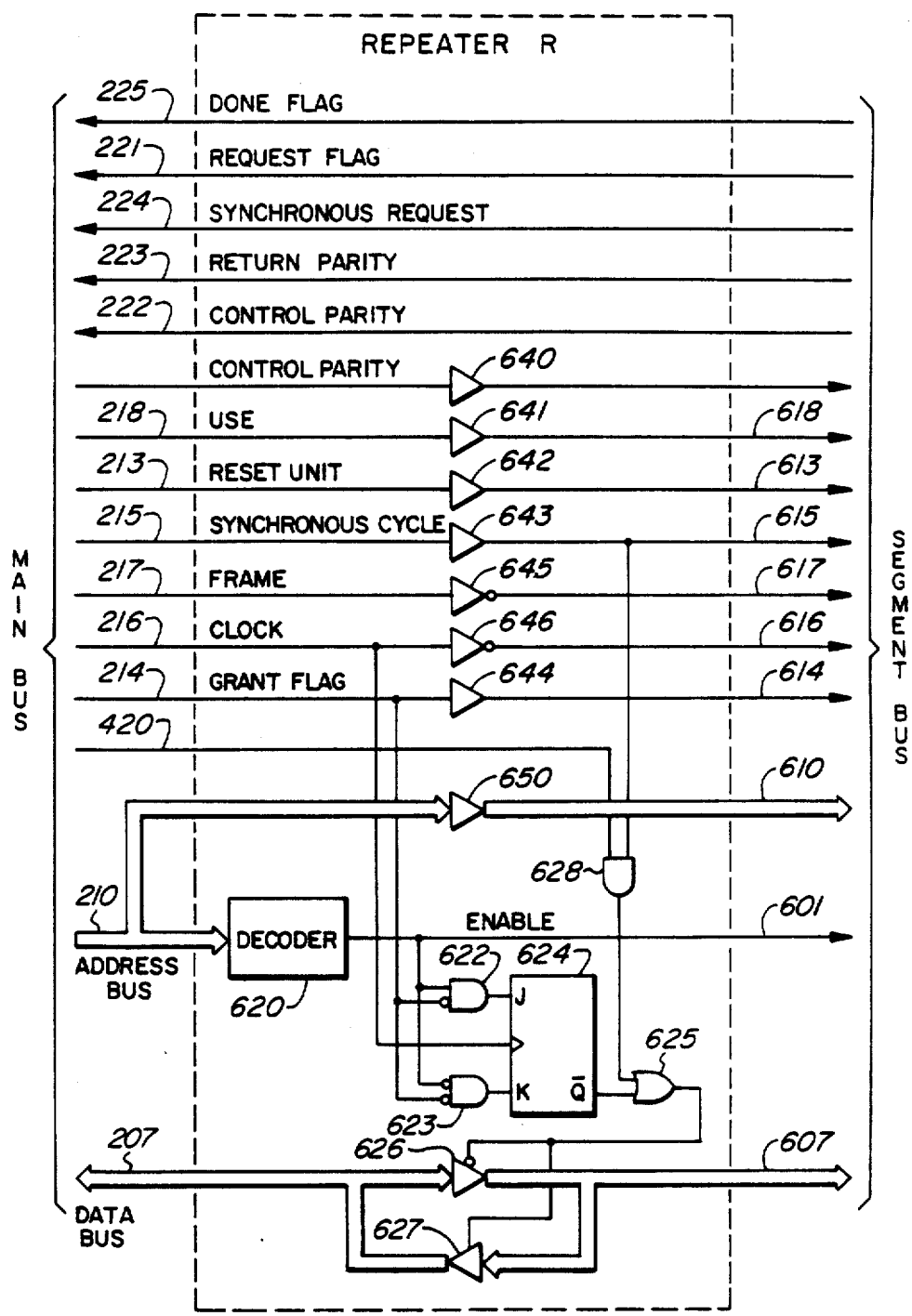
FIG. 6 is a block schematic diagram of one of a plurality of a repeater circuits used in the bus controller in FIG. 2.
Figure 7:
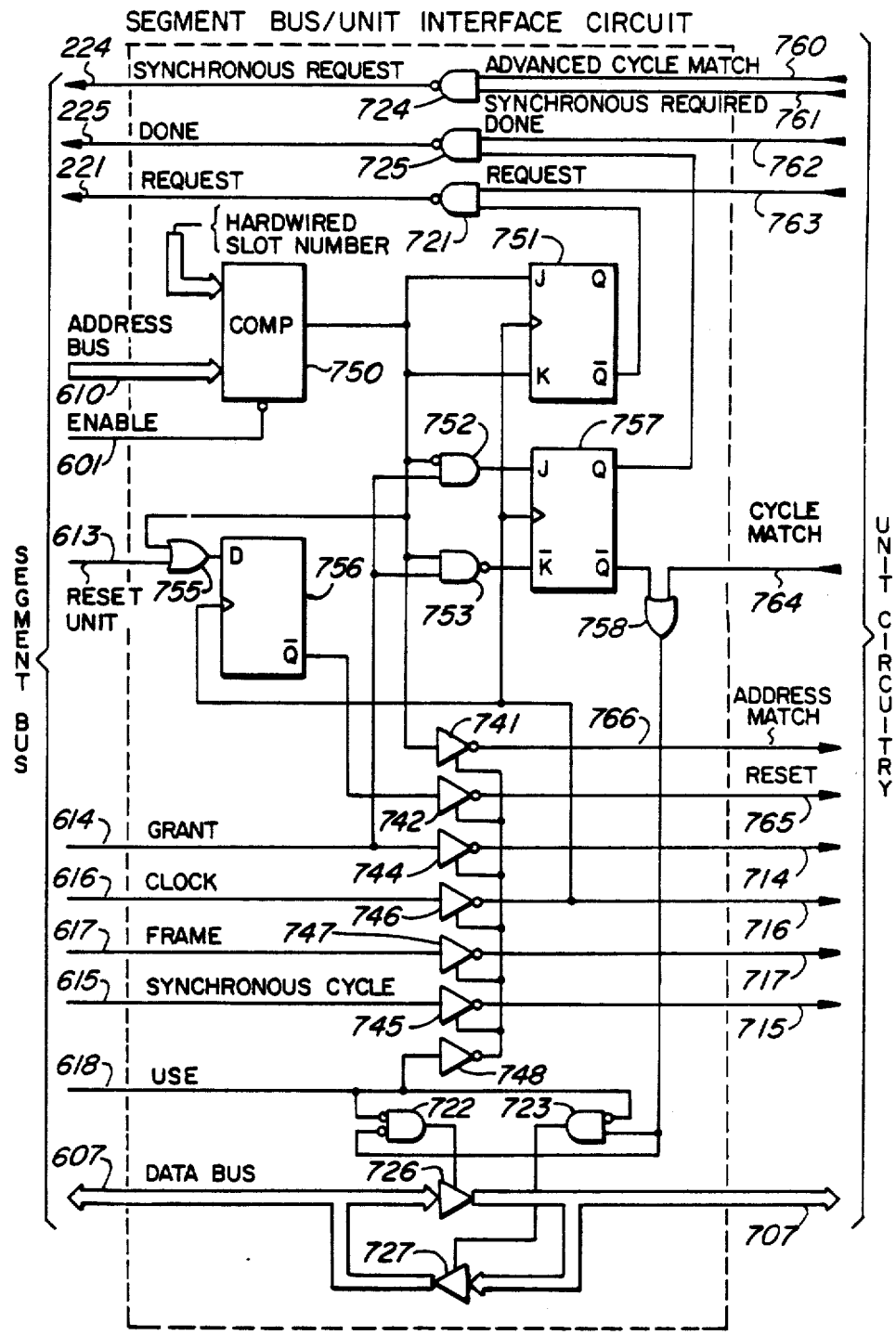
FIG. 7 is a block schematic diagrm of one of a plurality of segment bus unit interface circuits used in the communications networks in FIG. 1.

Referring to FIG. 2 a bidirectional microprocessor bus 201 is connected between an eight-bit microprocessor 200, a memory 202, an interface circuit 203, a bus 203 switchover circuit 204, a poll and grant circuit 300, a synchronous cycle counter and generator 400 and an error checking circuit 500. The memory 202 provides permanently stored program instructions defining routines implemented by the microprocessor 200 for configuring operation of the Bus Controller. In this example the microprocessor is an Intel 8031. The memory 202 also provides temporary storage for use by the microprocessor 200. The interface circuit 203 provides for data communication between the microprocessor bus 201 and the Units via DATA leads 607 in one of the segment buses as illustrated in FIGS. 6 and 7. In FIG. 2, the bus switchover circuit 204 includes an input connected to a control lead 219 labelled OTHER USE, and includes an output connected to a control lead 218 labelled USE. The OTHER USE lead 219 originates with a corresponding output of a bus switchover circuit in the other Bus Controller and the USE lead 218 terminates at a corresponding input of the bus switchover circuit in the other Bus Controller. The primary function of the bus switchover circuits 204 is that of ultimately controlling which of the Bus Controllers and its associated network is in an active mode of operation and which is in a standby mode of operation. The clock generator 205 in one example consists of an internal crystal oscillator and phase lock loop circuit, not shown, which generates a clock signal on a CLOCK one of the control leads 217 and a frame signal on a FRAME one of the control leads 216. The clock generator is designed such that it has three distinct modes of operation. The first mode occurs when the Bus Controller is in standby operation, which is indicated by the state of the OTHER USE lead 219. In the first mode the clock generator 205 provides the clock and frame signals being synchronized with corresponding signals produced by a corresponding clock generator in the other Bus Controller. Either of the second and third modes occurs while the Bus Controller is in active operation. In the second mode, the clock and frame signals are generated in synchronism with timing signals supplied on either of leads SYNCX and SYNCY. These timing signals originate in a remote system and are communicated via one of the Units. In the third mode, generation of the clock and frame signals depends wholly upon the free running operation of the internal oscillator. The null packet generator 206 operates substantially as a default data generator such that at times when no other element in the network is actively transmitting on the DATA leads, a null data packet is applied to the buses to prevent the DATA leads from floating. Signal assertions by the null packet generator are carried by the bus 207. Signal assertions by the null packet generator 206 are prevented in the presence of a synchronous cycle flag on a SYNCHRONOUS CYCLE lead 215.

The poll and grant circuit 300 is the source of all addresses for identifying a Unit in the network and is also the source of reset unit signals and the grant flags. The addresses are provided on the ADDRESS leads 210 and are thus distributed to each of the Bus Repeaters R and to the error check circuit 500. Operational parameters such as the range of unit addresses to be polled are determined by the microprocessor 200. However the moment to moment operation of the poll and grant circuit 300 is in response to request flags and done flags generated by the Units and received via REQUEST ones of control leads 221 and DONE ones of the control leads 225.

The synchronous cycle counter and generator 400 defines from the clock and frame signals on the CLOCK and FRAME leads 217 and 216, bus cycle occurrences in frames of bus cycles. The microprocessor 200 defines a range of bus cycles in which a synchronous transmission request received from a Unit via a SYNCHRONOUS REQUEST one of the control leads 224, may be granted via the SYNCHRONOUS CYCLE lead 215.

The error check circuit 500 monitors signals generated within the Bus Controller and signals generated in the remainder of the network to detect fault occurrences. The state of the network as determined by the error check circuit 500 is available to the microprocessor 200 via the microprocessor bus 201. The error check circuit 500 monitors bus cycle counting performed by the sycnchronous cycle counter and generator 400 via a bus 401, addressing performed by the poll and grant circuit 300 via the ADDRESS leads 210, data information on the bus 207, synchronous cycle flags on the SYNCHRONOUS CYCLE lead 215, control parity signals on CONTROL PARITY leads 222, and return parity signals on RETURN PARITY leads 223. The control parity and return parity signals are generated by the Teminator T. The error check circuit 500 under some detected fault condition generates an abort signal on a lead 501 for controlling operation of the poll and grant circuit 300.

Figure 3:
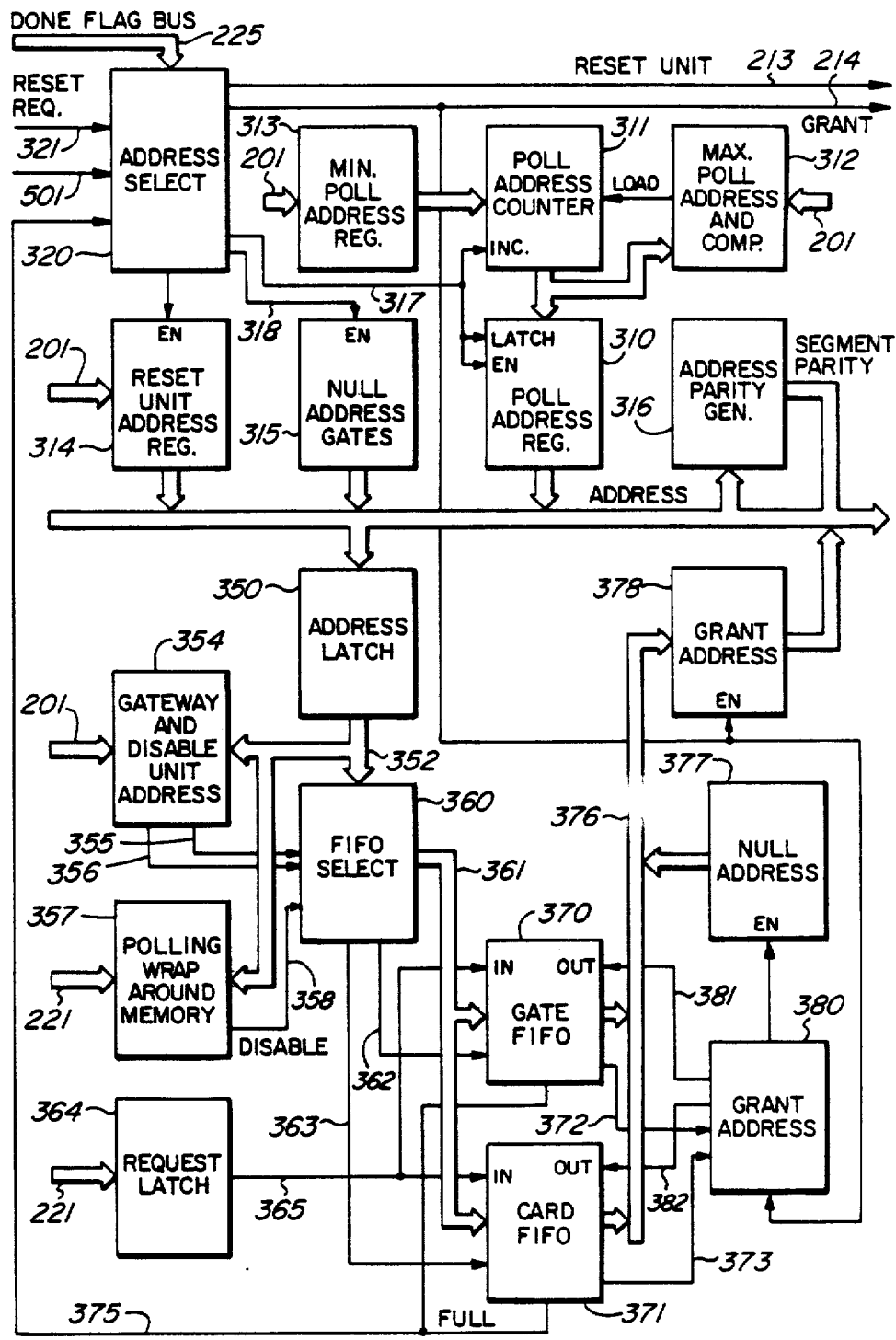
FIG. 3 is a block schematic diagram of poll and grant logic circuitry used in the bus controller in FIG. 2.

The poll and grant circuit 300 is illustrated in detail in FIG. 3. Circuitry in the upper part of FIG. 3 is primarily concerned with polling Units in the network for service requests being indicated by the request flag. Circuitry in the lower portion of FIG. 3 is primarily concerned with storing and queuing addresses of the various Units which have asserted the request flag and ultimately satisfying each service request. In the poll and grant circuit 300 addresses are applied to the ADDRESS leads 210 from any of four sources, a poll address register 310, a reset unit address register 314, null address gates 315, and a grant address register 378. The poll address register 310 asserts an address on the ADDRESS leads 210, each time it is enabled by an address select circuit 320 via a lead 317. Addresses for the poll address register 310 are generated by a poll address counter 311 which is incremented with each enable occurrence on the lead 317. The poll address counter 311 generates sequential addresses in a range which is from time to time defined by the microprocessor 200 via the bus 201. One end of the range is stored in a minimum poll address register 313 and the other end of the range is stored in a maximum poll address register and comparator circuit 312. In operation each time the address generated in the poll address counter 311 corresponds to the maximum of the range, the maximum poll address registers and comparator circuit 312 generates a load signal which causes the poll address counter 311 to start counting from the minimum address of the range as registered in the minimum poll address register 313. The null address gates 315 are controlled by the address select circuit 320 via a lead 318 to assert a predetermined null address on the ADDRESS leads 210 during a bus cycle when no other address is asserted to activate the null packet generator 206. The reset unit address register 314 provides for a Unit reset function wherein the address of the Unit is defined by the microprocessor 200 via the bus 201 and the time at which the Unit is reset is determined by the address select circuit 320 which enables assertion on the ADDRESS leads 210 coincident with generating a reset unit flag on a RESET lead 213 in response to having received a reset request on a lead 321. An address parity generator 316 responds to each address appearing on the ADDRESS leads 210 by generating parity signals on parity ones of the ADDRESS leads 210.

The circuitry in the lower portion of FIG. 3 is concerned with granting bus cycles to those Units which having been polled have asserted a request flag. An address latch 350 receives addresses on the ADDRESS leads 210 and passes these addresses via a bus 352, to a first in, first out (FIFO) select circuit 360, to a gateway and disable unit address circuit 354, and to a polling wrap around memory 357. A distinction is made between those of the Units which are specialized for larger bandwidth communications as with respect to those Units which are intended for more typical bandwidth of communications. For convenience the higher speed Units are referred to as Gateway Units and the remaining Units are referred to as Card Units. Addresses of both the Gateway Units and disabled ones of the Gateway and Card Units are defined by the microprocessor 200 and are received via the bus 201. These addresses are stored in the gateway and disable unit address circuit 354. In the event that an address on the bus 352 corresponds to one of the stored addresses, the gateway and disable unit address circuit 354 asserts a control signal on one of respective leads 355 or 356. Assuming for the moment that the control signal is not asserted, the FIFO select circuit 360 passes the address to a bus 361 and asserts a card FIFO enable signal on a lead 363. This occurs two bus cycles after the address was asserted on the address bus. If the addressed Unit has responded to the polling occurrence, a request flag is received by a request latch 364 via one of the REQUEST leads 221. The request flag is received during a bus cycle following the polling incident and a corresponding request control signal is generated on a lead 365 by the request latch 364, two bus cycles following the polling incident. A card FIFO 371 responds to the signals on the leads 363 and 365 by storing the address from the FIFO select circuit 360. Hence Card Unit addresses are queued for subsequent granting. Assuming for the moment that the control signal is asserted on the lead 355, as would be the case when the polling address on the address bus was that of a Gateway Unit, the process described immediately preceding is changed only in that the FIFO select circuit 360 asserts a gate FIFO enable signal on the lead 362, thereby causing the Gateway Unit address to be queued in a gate FIFO 370 in the presence of the request control signal on the lead 365. If on the other hand the address corresponds to that of a Unit having been defined as disabled, gateway and disable unit address circuit 354 asserts a control signal on the lead 356 and neither of the FIFOs, 370 or 371, is selected by the FIFO select circuit 360. Hence even in the event that a disabled Unit raises a request flag, its address will not be queued for a subsequent granting. The polling wrap-around memory 357 receives the addresses from the bus 352 and request flag signals on the REQUEST leads 221. In the event that a request flag signal is received, a corresponding memory location is set and is not reset until the same address is again received in the absence of the request flag signal. When the corresponding memory location is set, the polling wrap-around memory asserts a disable signal on a lead 358, which prevents the FIFO select circuit 360 from selecting either of the FIFOs 370 and 371. Hence polling wrap-around which is characterized by more than one appearance of any one address in either of the FIFOs 370 and 371 is prevented. Each of the FIFOs 370 and 371 include full and empty output ports at which corresponding signals are asserted to indicate the state of each FIFO as being one of full of queued addresses or empty. The full ports are wire ORED on a full lead 375 which is connected to an input of the address select circuit 320. The empty ports are connected via respective empty leads 372 and 373 inputs of a grant address circuit 380. The grant address circuit 380 is responsive to grant flags on the GRANT lead 214 to generate output control signals alternately on leads 381 and 382 for causing the respective FIFOs to alternately output previously queued addresses, one after the other, onto a bus 376. If one of the FIFOs is empty only the other FIFO is caused to output the queued addresses. Each address appearing on the bus 376 is applied to the ADDRESS leads 210 via a grant address register 378 in response to the grant flag. In the event that a grant flag occurs, as in each case whereby the address select circuit 320 indicates the end of a packet transmission to the Units, and at the same time both of the FIFOs 370 and 371 are empty, the grant address circuit causes a null address to be asserted on the bus 376 by a null address source 377. In the event that a full signal is received by the address select circuit 320 polling is halted until sufficient queued addresses are applied to the address bus 210 to provide at least one address space in each of the FIFOs 370 and 371.

Figure 4:
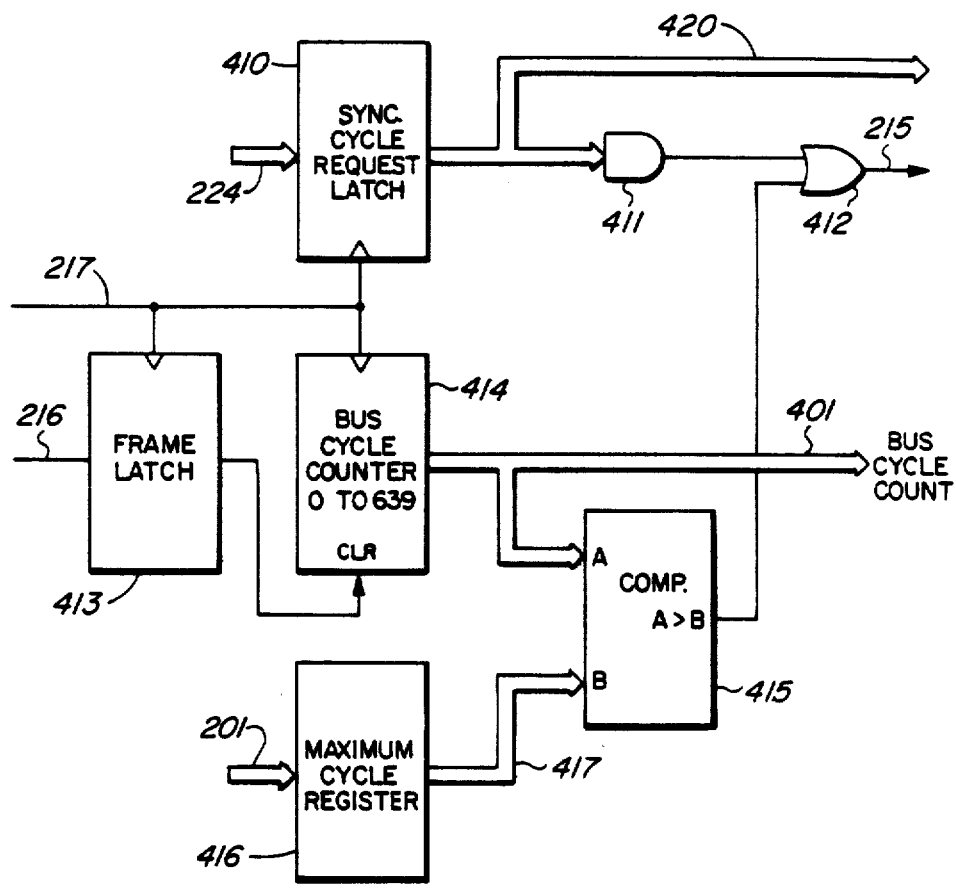
FIG. 4 is a block schematic diagram of a synchronous cycle counter and generator used in the bus controller in FIG. 2.

A primary function of the synchronous cycle counter and generator 400, illustrated in FIG. 4, is that of limiting synchronous access to the Data leads 207 so that there is always some failsafe time available for asynchronous communications. A Unit may assert a synchronous request signal two bus cycles prior to a bus cycle having been assigned to it by the call control Unit. Each synchronous request is received via one of the SYNCHRONOUS REQUEST leads 224 and is latched into a synchronous cycle request latch 410 under the control of the clock signals on the CLOCK lead 217. One bus cycles later, the state of the synchronous cycle request latch 410 is applied at inputs of an AND gate 411 which passes any low signal assertion to an input of an OR gate 412. An output of the OR gate 412 is the origin of the SYNCHRONOUS CYCLE lead 215. The OR gate 412 pases the low signal assertion onto the synchronous cycle lead 215 in the event that an output of a comparator 415 is also asserted low. A frame latch 413 receives the frame signal on the FRAME lead 216 under the control of the clock signal on the CLOCK lead 217 and provides the frame signal at a clear input of a bus cycle counter 414. The bus cycle counter is operated by the clock signals on the CLOCK lead 217 to count from its cleared state of zero through to a count of 639 whereupon it is cleared by the delayed frame signal. Outputs of the bus cycle counter 414 are the origin of the bus 401. In this example the bus 401 carries ten binary signal bits in parallel for use in the error check circuit 500 and provides the eight highest order binary bits at an input A of the comparator 415. Another input B of the comparator 415 is connected, via a bus 417, to an output of a maximum cycle register 416. The maximum cycle register stores a maximum cycle number, as defined by the microprocessor 200 via the microprocessor bus 201, beyond which synchronous cycle occurrences are inhibited by the comparator 415.

Figure 5:
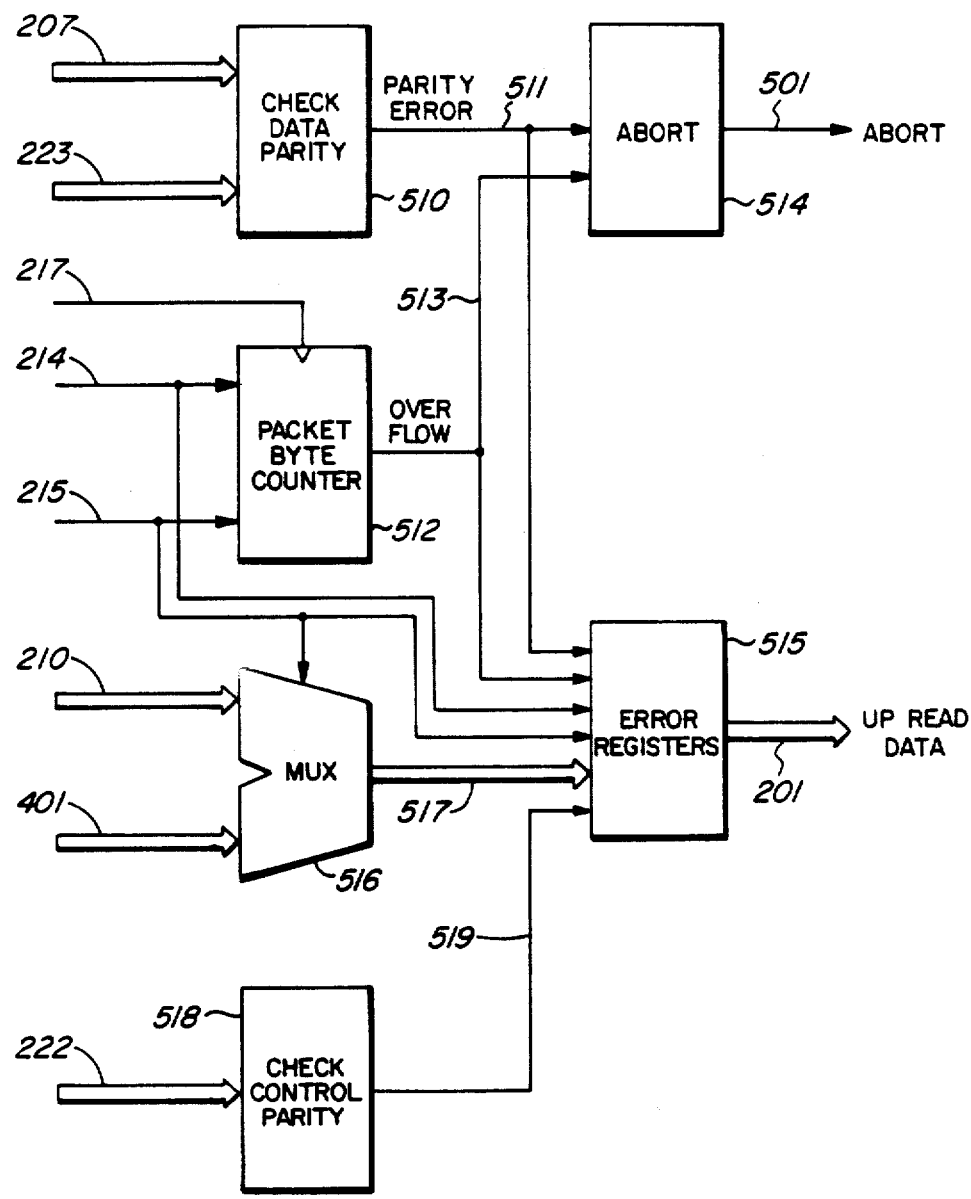
FIG. 5 is a block schematic diagram of error checking circuitry used in the bus controller in FIG. 2.

The error check circuit 500, illustrated in FIG. 5 is primarily concerned with providing information to the microprocessor 200 with respect to various error occurrences in the network. The error check circuit 500 also generates an abort control signal, for use by the address select circuit 320. The DATA leads 207 and RETURN PARITY leads 223 are monitored by a check data parity circuit 510. In the event of a parity error in signals on either of the leads 207 and the leads 223, the check data parity circuit 510 generates a parity error signal on a parity error lead 511. A packet byte counter 512 is initiated at a zero count with each occurrence of the grant flag on the GRANT lead 214. The packet byte counter 512 counts clock signals on the CLOCK lead 217 and in the event that it reaches a count of 4096 it generates an overflow signal on an OVERFLOW lead 513. The overflow signal indicates that a Unit has reached an unexceptable maximum packet length in a single packet transmission. Each occurrence of the synchronous cycle signal on the SYNCHRONOUS CYCLE lead 215 inhibits the response of the counter 512 to the instant clock signal on the CLOCK lead 217. A multiplexer 516 gates the state of the ADDRESS leads 210 to a bus 517 except during an assertion of the synchronous cycle signal on the lead 215 whereupon the instant bus cycle count on the bus 401 is gated to the bus 517. A check control parity circuit 518 receives parity signals from the Terminator T on the CONTROL PARITY leads 222 and indicates a parity error on a parity error lead 519 in the event that at least one of the signals on the CONTROL PARITY leads 222 is asserted. Error registers 515 provide for temporary storage of error events as indicated on any of the leads 511, 513 and 519, and also provide for temporary storage of either the transmitting Unit's address or the bus cycle count at the instant of the error. If for example a parity error occurs on the DATA leads 207 during a synchronous cycle, the bus cycle count is stored and made available to the microprocessor 200. If for example an overflow error occurs, the address at the time of the last grant flag signal occurrence is made available to the microprocessor 200. In the event of either of a packet data parity error or an overflow, an abort circuit 514 asserts the abort signal.

FIG. 6 illustrates one of the Repeaters R. Each of the Bus Controllers in FIG. 1 requires up to six Repeaters R for interfacing its Main Bus with up to six corresponding Segment Buses. Each Segment Bus includes leads labelled 221-225 each of which is wire connected to a single lead in a corresponding lead groups 221-225 in the Main Bus of the Bus Controller. The leads 209, 213, 214, 215, 218 in the Main Bus are coupled via amplifiers 640-644 to corresponding leads in the Segment Bus. The leads 216 and 217 are coupled via inverting amplifiers 645 and 646 to corresponding leads in the Segment Bus. In the Segment Bus the amplifier coupled leads are identified with corresponding units and ten digits in combination with the numeral six in the hundred digit position. Lower order ones of the ADDRESS leads 210 are amplifier coupled via amplifiers 650 to corresponding ADDRESS leads 610 in the Segment Bus. The remaining higher order ones of the ADDRESS leads 210 are decoded by a decoder 620 such that in the event that these higher order leads are of a signal state combination unique to the particular Repeater R a segment enable signal is asserted on an ENABLE lead 601. A data transfer control circuit includes AND gates 622 and 623, a JK flip-flop 624 and an OR gate 625 and an AND gate 628 connected as shown for controlling operation of receive signal transfer gates 626 and transmit signal transfer gates 627. The data transfer control circuit is responsive to a coincident occurrence of the grant flag signal and the segment enable signal in the case of packet transmission for permitting asynchronous signal transmission via the gates 627 to the DATA leads 212 of the main bus. In the case of synchronous signals a delayed synchronous request on one of the leads 420 is used by teh AND gate 628 to gate the synchronous cycle signal to the OR gate 625 to cause signal transmission via the gates 627. Otherwise the gates 626 permit receive signal transmission to the DATA leads 612 of the Segment Bus.

The Segment Bus/Unit interface circuit in FIG. 7 is used to provide communication between a Unit and one of the Segment Buses. Two of these interface circuits are required for each Unit, one in connection with the Segment Bus A and the other in connection with the Segment Bus B. Each interface circuit provides for the data information transfer function and address and timing interface requirements for all types of Units be they of a synchronous or of an asynchronous nature.

In the Segment Bus/Unit interface circuit in FIG. 7 grant flag, clock, frame and synchronous cycle signals on leads 614-617 are gated, via inverting transmission gates 744-747, to corresponding leads 714-717 for use by an associated Unit under the control of the use signal on the USE lead 618 which is coupled to control ports thereof by an inverting amplifier 748. A NAND gate 724 generates a synchronous request signal on the SYNCHRONOUS REQUEST lead 224 in the Segment Bus in response to coincident occurrences of an advanced cycle match signal on a lead 760 and a synchronous required signal on a lead 761, from the associated Unit. A comparator 750 is connected to receive a slot number, which is defined by binary bit states in accordance with the physical location of the Segment Bus/Unit interface circuit in the network, and to receive the lower order bits of the address on the ADDRESS leads 610. The comparator 750 generates an address match signal at its output in response to the slot number and the address being equal in the presence of the segment enable signal on the lead 601. The output of the comparator 750 is connected as shown to a JK flip-flop 751, an AND gate 752, a NAND gate 753, an OR gate 755 and the inverting transmission gate 741. The address match signal is gated via the inverting transmission gate 741 to the lead 766 for use in the associated Unit. The JK flip-flop 751 provides a timing signal for gating a request signal from the associated Unit via a lead 763, and a NAND gate 721 to the REQUEST lead 221 in the Segment Bus. This timing signal is provided in response to an occurrence of the match signal and occurs coincident with the next occurring pulse of the clock signal as gated to the lead 716. Outputs of the gates 752 and 753 are connected to J and inverting K inputs of a JK flip-flop 757. A Q output of the JK flip-flop provides a gating signal for gating a done signal from the associated Unit via a lead 762 and a NAND gate 725 to the DONE lead 225 of the Segment Bus. The gating signal is also provided from an inverting Q output of the JK flip-flop 757 to an input of an OR gate 758. This gating signal is initiated in response to a coincident occurrence of a pulse of the grant flag on the GRANT lead 614 and the address match signal from the comparator 750 at the time of the next following pulse of the clock signal on the lead 716. The gating signal is terminated in response to the next occurrence of the grant flag signal at the time of the next following pulse of the clock signal. The outputs of the respective NAND gate 721, 724 and 725 in each segment/unit interface circuit are WIRE ORed with those of the other segment/unit interface circuits connected to the segment bus.

The OR gate 758 also includes an input connected to receive a cycle match signal from the associated Unit via lead 764. Either of the gating signals from the JK flip-flop 757 or the cycle match signal from the lead 764 is coupled via the OR gate 758 to an input of an AND gate 723 and to an inverting input of an AND gate 722. The AND gates 722 and 723 each also include inverting inputs connected to the USE lead 618. Receive transmission gates 726 are used to couple data information signals from the DATA leads 607, in the Segment Bus to DATA leads 707 for reception by the associated Unit. Transmit transmission gates 727 are used to couple data information signals from the associated Unit, via the DATA leads 707, to the DATA leads 607. The receive transmission gates 726 are controlled from an output of the AND gate 722 to be ON in the presence of the use signal on the lead 618 while the output of the OR gate 758 is not asserted, and otherwise to be OFF. The transmit transmission gates 727 are controlled from an output of the AND gate 723 to be ON in the presence of the use signal while the output of the OR gate 758 is asserted and to otherwise be OFF. The RESET UNIT lead 613 of the Segment Bus is connected to an input of the OR gate 755, the output of which is connected to a D input of a D type flip-flop 756. The occurrence of a pulse of the reset signal coincident with the address match signal causes the flip-flop 756 to assert a reset signal at its inverting Q output at the moment of the next occurring clock pulse on the CLOCK lead 716. The reset signal is coupled to a reset lead 765 via the inverting gate 742 for use in the associated Unit.

Each of the Units shown in FIG. 1 have the ability to transmit and receive asynchronous data information signals via its associated Segment Bus/Unit interface circuit (FIG. 7) and the Segment Bus. Some of these Units may also have the capability of being able to transmit and receive synchronous data information signals. Such capability is required in cases in which the Unit provides a port for a synchronous data stream in for example the T1 TDM format, or provides a port for one or more analog or digital telephone station sets. At least one of the remaining Units is the previously referred to call controller Unit. The call controller Unit includes a processor and program and data memories. The call controller Unit is exemplary of various known central processing units, operable in accordance with stored program instructions, for controlling the setting up and tearing down of communication paths or channels in a telephone switching network. One suitable processor for this purpose is identified by device code 68000 and is available from Motorola. Of course an appropriate processor input/output interface is required to interface any signal level and timing differences between the processor and the Segment Bus/Unit interface circuit. The cynchronous Units require connection memory, for storing call set up information, supervisory status registers and the like, typical of a communication network port in a TDM telecommunication switching exchange. The structures and operations of the various types of the Units are not described as such will be apparent to persons of typical skill in the electronic arts pertaining to the structures and operations of digitally controlled TDM switching networks in view of the present disclosure and such communication features as said persons envisage.

In operation of the telecommunication switching network, inter and intra Unit communications are by way of the DATA leads in the Segment and Main Buses. Packetized data communications pertaining to information signals entering and leaving the network are communicated via the DATA leads between Units having an asynchronous communication capability. Synchonous data communications take priority over the packetized data communications and exclusively pertain to information signals entering and leaving the network. The synchronous data communications are always conducted between Units having a synchronous capability by way of the DATA leads. Destination identifications for all information signals entering and leaving the network are assigned by the call controller Unit in response to service rquests from the individual Units. Communication between each of the Units and the call controller Unit is by means of asynchronous packetized data which is also transmitted via the DATA leads. The call controller Unit has no other facility other than the DATA leads of the A and B Segment Buses for communicating with the other Units and the Main Buses.

Figure 8:
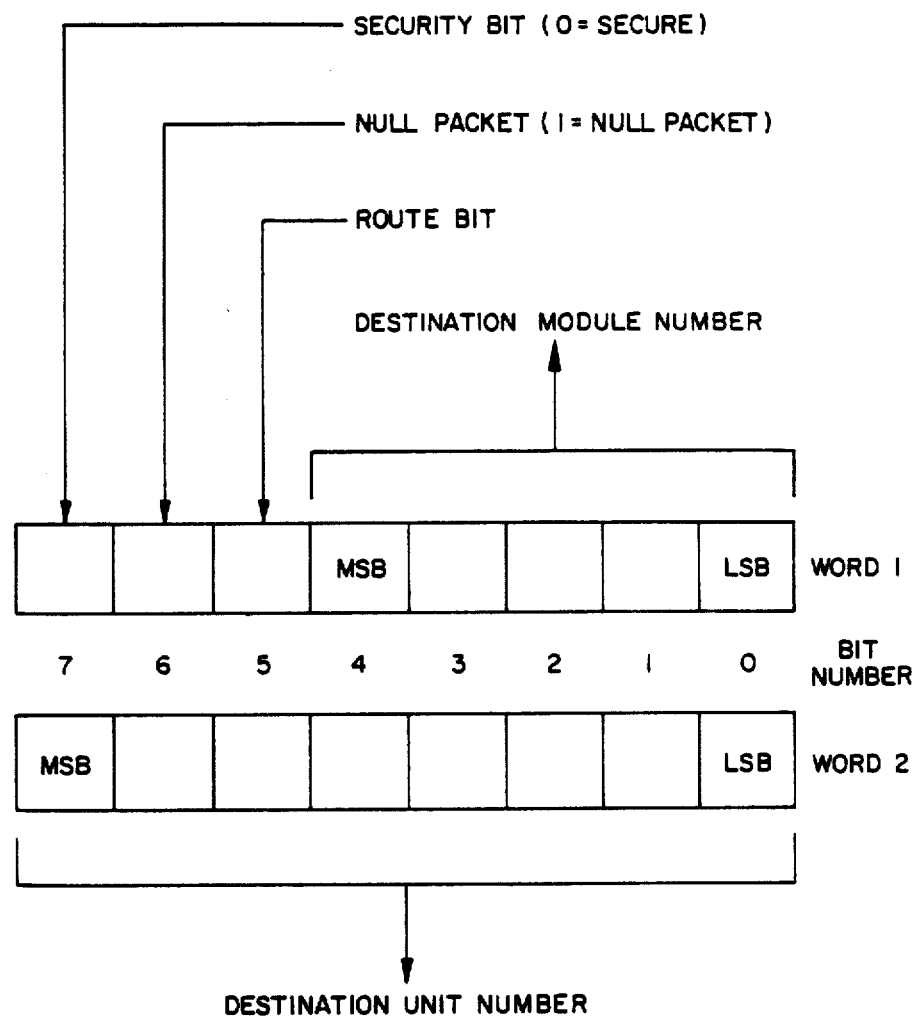
FIG. 8 is an illustration of an address format for communication of packetized data via the communication networks in FIG. 1.

A packetized data format is illustrated in FIG. 8. A data packet consists of up to 4096 words. Each word consists of eight binary bits plus a parity bit, not shown. The bits of each word are transmitted in parallel on the DATA leads. The words of the data packet are sequentially broadcast one word after the other throughout the telecommunications switching network. The first word of the packet includes a Security bit (7) which when asserted indicates that the packet is a network control packet. A Null bit (6) is asserted solely by the Bus Controller to indicate a null packet and it prevents any of the Units from responding to the remainder of the word. Destination Module bits (4 - 0) specify which one of networks similar to the network of FIG. 1 the data packet is destined to be received in, and a Route bit (5) indicates which of up to two possible Inter Module Switch Units is designated for transmission of the data packet in the case where another network is specified by the Destination Module bit. The second word consists of Destination Unit Number (bits 7 - 0) which corresponds to a data address of the Unit for which the remainder of the words of the packet are intended for reception.

Any Unit receiving information for transmission in the form of packetized data via the telecommunications switching network first requests service by means of one or more data packets each having a header defining the call controller Unit as the destination of the data packet. Subsequently in response to the service request, the call controller Unit transmits a data packet having a header defining the requesting Unit as its destination. The packet also includes the destination address of the required receiving Unit. Subsequent to this the requesting Unit transmits the information in the form of one or more data packets, each data packet having a header as defined by the call controller Unit. The transmission of each packet is continuous with the possible exception of one or more temporary halts to permit one or more synchronous transmissions from one of more other Units.

The signal protocol by which access to the DATA leads is granted and packetized data is transmitted is illustrated in FIG. 9. FIG. 9 includes eight time related rows which are illustrative of signals and functions as labelled together with bracketed numeric identifications of associated leads in the preceding figures. The nature of signals transmitted during each bus cycle on the DATA leads is exemplified by a row labelled DATA wherein null data is signified by the letter "N", synchronous data is signified by the letter "S", and each word of each data packet is indicated by a transmitting unit number followed by the word number in the data packet. Addresses are generated for the ADDRESS leads 210 by the poll and grant circuit 300. In this example address 0–191 are generated. Synchronous cycle occurrences are defined by the synchronous cycle signal on the SYNCHRONOUS CYCLE lead 215. In this example a request flag is asserted by the Unit, having a hardwired slot number 1, in the bus cycle following the address 1 occurrence. However as the DATA leads are not immediately available for data packet transmission due to synchronous transmission occurrences the DATA leads are not immediately granted to the Unit 1. Addressing continues until the DATA leads are available whereupon the address for the Unit 1, to which the DATA leads are granted, occurs simultaneously with the grant flag. It should be noticed that in this example a Unit of address 5 also requests access for a data packet transmission. In the bus cycle following the grant flag occurrence, the Unit 1 begins a packet transmission of which words one and two are header information consistent with FIG. 8. The Unit 1 transmits words one through five before being interrupted by a synchronous transmission occurrence. Three bus cycles later the Unit 1 transmits the sixth word and as it has only one word of its packet left to transmit, it generates a done flag on the DONE lead 225. Following yet another interruption by a synchronous transmission the last word of the packet is transmitted from the Unit 1 while at the same time the address for the Unit 5 and the grant flag are provided from the poll and grant circuit 300. The poll and grant circuit 300 immediately resumes polling for requests at address 16 and so on. After yet another synchronous transmission interruption the Unit 5 begins to transmit a data packet. As the microprocessor 200 has at some time recently detected some operational discontinuity in Unit 19, at the bus cycle in which the Unit 19 is addressed, the reset unit signal is asserted on the RESET UNIT lead 213 by the poll and grant circuit 300. All of the Units are capable of asynchronous communications in accordance with the protocol illustrated in FIG. 9, and although not shown include elastic storage queues, for transmission and reception of data packets, and appropriate call supervision and connection memory means.

In FIG. 10 the synchronous bus cycle protocol is illustrated. FIG. 10 includes six time related rows which are illustrative of signals and functions as labelled together with bracketed numeric identification of associated leads in the preceding figures. The nature of signals transmitted during each bus cycle on the DATA leads is exemplified in a row labelled DATA wherein asynchronous data is signified by the letter "P" and synchronous data is signified by a numeric label corresponding to the instant bus cycle. The only relationship between the access protocol for packetized data and the synchronous bus cycle protocol is that with each occurrence of a synchronous transmission the packet access protocol is arrested as if time has ceased until synchronous transmission ceases whereupon the packet access protocol resumes exactly where it had left off. A frame signal pulse occurs with a period of one millisecond, during which time eight sub-frames of 640 bus cycles each occur. Synchronous cycle requests originate in individual ones of the Units at times of bus cycle occurrences having been defined by the call controller Unit. Each synchronous cycle request occurs one bus cycle in advance of the moment when a synchronous cycle grant may be provided on the SYNCHRONOUS CYCLE lead 215, after which time, transmission of a single word occurs on the DATA leads. The transmitted word is received only by the Unit specified by the call controller Unit. Those of the Units capable of synchronous communication in accordance with the protocol illustrated in FIG. 10, also include circuit means for defining the bus cycle occurrences by number somewhat similar in function to the bus cycle counter 414 in FIG. 4, and appropriate supervision and connection memory means for synchronous signal calls.

The invention has been exemplified in the description of the example embodiment wherein a telecommunication time division multiplex switching network is alternately operable in either of asynchronous and synchronous information transfer modes. The invention is defined in the following claims.

What is claimed is:

1. A telecommunications switching network comprising:
   a plurality of units including a call controller unit;
   a first data bus comprising a group of data leads being connected in parallel to each of the units, said data leads being commonly available for signal transmission of call control signals between the call controller unit and others of said plurality of units, and for signal transmission of communications signals between said others of said plurality of units; and
   a first bus controller means connected to each of the units for arbitrating access to the data leads by the units, so that only one of said units may transmit signals at any one instant in time.

2. A telecommunications switching network as defined in claim 1 wherein the bus controller comprises:
- a poll means for polling the units for asynchronous transmission requests;
- grant means for granting access to the data leads for an indefinite period of time, as required for transmission of a data packet from one of the units, sometime after an occurrence of an asynchronous transmission request from said one unit; and
- a synchronous cycle means being responsive to an occurrence of a synchronous request signal from any of the units, for generating a synchronous cycle signal for a predetermined time commencing at a preset time after said occurrence, for inhibiting any data packet transmission from any one of the units and for enabling a synchronous data transmission via the data leads during said predetermined period of time.

3. A telecommunication switching network as defined in claim 1, wherein the bus controller is connected to the units via a group of address leads and a plurality of control leads, and wherein the bus controller comprises:
- a poll means, including an address counter for periodically generating a series of addresses for polling the units one after another via the address leads; and
- a grant means comprising a queue storage means being responsive to an occurrence of an asynchronous transmission request in the form of a request flag having been asserted on a request one of the control leads by a polled unit, for storing an address corresponding to the polled unit; and
- an address select means being responsive to at least one address having been stored in the queue storage means for inhibiting the address counter and for causing the address to be withdrawn from the queue storage means and for simultaneously asserting said address on said address leads and generating a grant flag on a grant one of the control leads.

4. A telecommunication switching network as defined in claim 3 wherein the bus controller further comprises:
- a synchronous cycle means being responsive to an occurrence of a synchronous request signal from any of the units, for generating a synchronous cycle signal for a predetermined time commencing at a pre-set time after said occurrence, for inhibiting any data packet transmission from any one of the units and for enabling a synchronous data transmission via the data leads during said predetermined period of time.

5. A telecommunications switching network as defined in claim 4, wherein the bus controller further comprises:
- means for generating clock and frame signals on clock and frame ones of the control leads, respectively, each frame signal having a period corresponding to a sum of a predetermined plurality of n clock signal periods; and wherein the synchronous cycle means comprises:
- a first gating circuit means for defining a portion of each frame period within which synchronous cycle signals are permitted and for generating an enable signal in response to the clock and frame signals during said portion of each frame period; and
- a second gating circuit means responsive to the clock signals and the enable signal for generating the synchronous cycle signal, on a synchronos cycle one of the control leads, said synchronous cycle signal being delayed a predetermined period of time from each occurrence of the synchronous request signal on a synchronous request one of the control leads.

6. A telecommunications switching network as defined in claim 3, wherein the poll means further comprises:
- a poll range limiting means having first and second limits corresponding to limits of a range of addresses, for causing the address counter to be loaded with one of the limits in response to the address counter having attained a count corresponding to the other of the limits, wherein in operation polling and subsequent grants may be limited to a population of less than a maximum possible number of units in the switching network.

7. A telecommunications switching network as defined in claim 3, wherein the grant means further comprises:
- a disable unit address circuit means for receiving restricted addresses, said restricted addresses defining ones of the units restricted from operation, wherein said disable unit address circuit means is responsive to an occurrence of a corresponding restricted unit address on the address leads so as to prevent storage of the corresponding restricted unit address in the queue storage means.

8. A telecommunications switching network as defined in claim 3, wherein the grant means further comprises:
- a wrap around circuit, means responsive to said asynchronous transmission request, for preventing storage in the queue storage means of an address corresponding to an address presently stored in the queue storage means.

9. A telecommunications switching network as defined in claim 3, wherein the grant means further comprises:
- a wrap around circuit means comprising a plurality of memory locations corresponding to each of the addresses providable from the poll means, wherein each memory location is set upon the presence of both its address and an assertion of the request flag, and wherein each memory location is reset in the presence of its address while the request flag is unasserted; and
- gating means for generating an inhibit signal, in response to each address occurrence for which the corresponding memory location was set, for preventing storage of the corresponding address in the queue storage means.

10. A telecommunications switching network as defined in claim 3, wherein each of the plurality of units is connected by a respective bus/unit interface circuit means for transmitting and receiving call control signals and communication signals via the data leads, wherein each unit is responisve to signals on various ones of the control leads and each unit originates signals on various ones of the control leads, the bus/unit interface circuit comprising:
- a matching means for generating an address match signal for use in the bus/unit interface in response to a correspondence between an address on the address leads and a preset address on the bus/unit interface circuit;

a request gating means for asserting the request flag on the request one of the control leads in response to a request signal from a respective unit and a pulse of a clock signal immediately following the address match signal from the matching means;

a grant latch means for generating a unit grant signal commencing with a pulse of the clock signal immediately following a coincidence of the grant flag on the grant one of the control leads and the address match signal from the matching means, and thereafter for terminating generation of the unit grant signal commencing with a pulse of the clock signal immediately following a subsequent occurrence of the grant flag;

a done gating means for asserting a done flag signal on a done flag one of the control leads in response to a done unit signal from the respective unit occurring in the presence of the unit grant signal from the grant latch means;

a transmission gating means for transmitting call control signals and communication signals from the respective unit to the data leads in response to the unit grant signal from the grant latch means, and also in response to a cycle match signal from the respective unit, and for alternately transmitting signals from the data leads to the respective unit in the absence of both the unit grant signal and the cycle match signal.

11. A telecommunications switching network as defined in claim 1, wherein the bus controller is connected to the units via a group of address leads and a plurality of control leads, the bus controller comprising:

a timing circuit means for generating frame and clock signals, the clock signal having a period defining a period of a bus cycle, there being n clock signal periods in a period of the frame signal;

a selection circuit means for selecting one of a poll circuit means and a grant circuit means as a source of addresses for transmission via the address leads in response to the clock signal, a state of a status signal from the grant circuit means, and a done flag on a done one of the control leads;

a synchronous cycle circuit means for defining bus cycle occurrences of zero through n during each frame period in response to the clock signal and the frame signal, the synchronous cycle circuit means being responsive to a synchronous request signal on a synchronous request one of the control leads for asserting a synchronous cycle signal on a synchronous cycle one of the control leads during a bus cycle in a setable range of the defined bus cycle occurrence;

the poll circuit comprising:

an address generating means for asserting addresses, within a setable range of addresses, one after another on the address leads and at the rate of the clock signal while said address generating means is selected by the selection circuit;

a grant circuit means comprising:

temporary storage means for synchronizing an occurrence of a grant flag signal in a grant flag one of the control leads with an associated address having been received from the address leads, a queue storage means for storing addresses from the temporary storage means, one after another, each storing being in response to the presence of an associated request flag signal, and for asserting the stored addresses on the address leads, one after another, each assertion being in response to a grant flag from the selection circuit means on the grant one of the control leads, the queue storage means including at least one status output lead being connected to the selection circuit means for indicating the queue storage means as being in a full state and for indicating said queue storage means as being in an empty state.

12. A telecommunications switching network as defined in claim 11, wherein each of the plurality of units is connected by a respective bus/unit interface circuit means for transmitting and receiving call control signals and communication signals via the data leads, wherein each unit is responsive to signals on various of the control leads and each unit originates signals on various of the control leads, the bus/unit interface circuit comprising:

a matching means for generating as address match signal for use in the unit in response to a correspondence between an address on the address leads and a preset address of the bus/unit interface circuit;

a request gating means for asserting the request flag on the request one of the control leads in response to a request signal from a unit and a pulse of a clock signal immediately following the address match signal from the matching means;

a grant latch means for generating a unit grant signal commencing with a pulse of the clock signal immediately following a coincidence of the grant flag on the grant one of the control leads and the address match signal from the matching means, and thereafter for terminating generation of the unit grant signal commencing with a pulse of the clock signal immediately following a subsequent occurrence of the grant flag;

a done gating means for asserting the done flag signal on a done flag one of the control leads in response to a done unit signal from the respective unit occurring in the presence of the unit grant signal from the grant latch;

a transmission gating means for transmitting call control signals and communication signals from the respective unit to the data leads in response to the unit grant signal from the grant latch means, and also in response to a cycle match signal from the respective unit, and for alternately transmitting signals from the data leads to the respective unit in the absence of both the unit grant signal and the cycle match signal.

13. A telecommunications network as defined in claim 1, wherein said first data bus and said first bus controller comprise a first pair, said telecommunications network further comprising a second pair, said second pair comprising a second data bus and a second bus controller, wherein each of the units is connected via a pair of a bus/unit interface circuits to said first and second data busses;

wherein said first and second bus controllers comprise a use circuit means for arbitrating which of the bus controllers is active and inactive, respectively, and for generating a use signal in the absence of a use signal from another bus controller;

wherein said use circuit means enable said bus/unit interface circuits to effect communication between each unit and the data bus in current use.

14. A method of operating a telecommunications switching network to provide for transmission of signals between units connected to a bus in the switching network wherein the signals include both call control signal for transmission between a call controller one of the units and another of the units and communication signals for transmission between calling and called ones of the other units, the method comprising the steps of:

(a) in a bus controller, arbitrating access to the bus for signal transmission from the units;
  (i) polling the units for asynchronous transmission requests and
  (ii) granting access to the bus for an indefinite period of time to each unit having responded to being polled in step (i);
(b) generating frame and clock signals for defining frame periods each consisting of a plurality of bus cycles, each bus cycle being a set time interval;
(c) in a unit requiring access to the bus for synchronous transmission, generating a synchronous request signal at a predetermined time preceding a designated bus cycle, said designated bus cycle having been designated by the call controller unit and thereafter transmitting a communication signal on the bus during the designated bus cycle; and in a unit defined by the call controller unit as a receiver during the designated bus cycle, receiving the communication signal from the bus during the designated bus cycle;
(d) in the remaining units including any unit having been granted access in step (ii), ceasing transmitting and reception throughout the duration of the designated bus cycle.

* * * * *